(No Model.)

J. M. HALL.
MOTOR.

No. 342,087. Patented May 18, 1886.

WITNESSES
Quincy A. Thomas.
Chas M Thomas

INVENTOR
John M Hall

UNITED STATES PATENT OFFICE.

JOHN M. HALL, OF OXFORD, MICHIGAN.

MOTOR.

SPECIFICATION forming part of Letters Patent No. 342,087, dated May 18, 1886.

Application filed September 29, 1884. Serial No. 144,299. (No model.)

*To all whom it may concern:*

Be it known that I, JOHN M. HALL, a citizen of the United States, residing at the village of Oxford, in the county of Oakland and State of Michigan, have invented certain new and useful Improvements in Motors, of which the following is a specification.

This invention has relation to improvements in coffee and spice mills, more especially to that class designed for hand-power; and it consists in the peculiar combinations and the novel construction and arrangement of parts, all as more fully hereinafter described and claimed.

Figure 1:
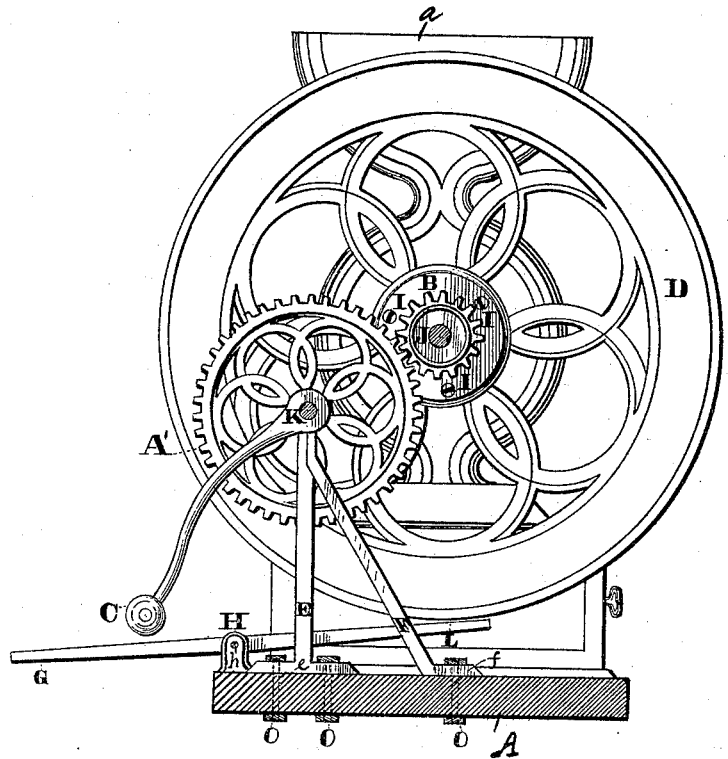
Figure 2:
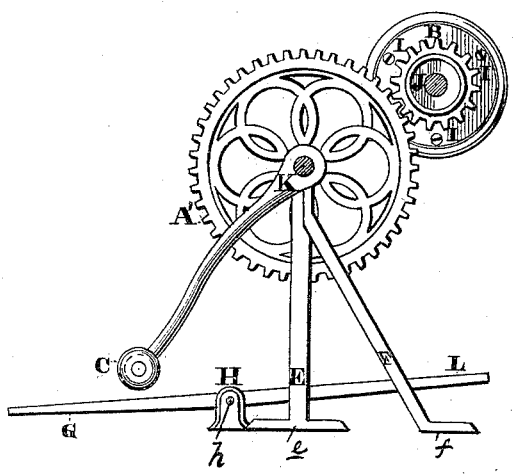

In the accompanying drawings, which form a part of this specification, Figure 1 is a side view of a coffee and spice mill with my improvements attached, and Fig. 2 is a similar view of the driving mechanism detached.

Referring to the drawings by letter, A indicates a suitable base supporting the mill, of which $a$ is the hopper and D the balance-wheel.

E is a standard, provided with a base or flange, $e$, through which the securing means pass to secure the same to the base A.

F is a brace formed with base $f$, by which it can be secured to the base A. The upper end of this brace is rigidly secured to the standard E near its top, as shown.

H is a standard, to which is pivoted, as at $h$, the brake-lever G, the end L of which is designed to bear upon the periphery of the balance-wheel when the opposite end of said lever is depressed, for the purpose of checking the motion of said balance-wheel and the driving mechanism.

A' is a gear-wheel on the shaft K.

C is the crank, secured to said shaft and by which the same is operated.

J is a pinion formed with a flange, B, through which flange pass the screws into the arms of the balance-wheel. By this construction the pinion J can be readily attached to any mill already in use, and said pinion, together with the gear-wheel A' and its attachments, can be sold separate and adapted for attachment to ordinary mills. By the use of this pinion and gear-wheel I secure a higher rate of speed than was formerly attained, and without any perceptible loss of power, and the process of grinding is facilitated proportionately.

I am aware that coffee and spice mills have been provided with brake-levers, and hence do not claim such broadly; but What I do claim is—

The combination, with the balance-wheel D, of the pinion J, provided with flange B, screws I, passing through said flange into the arms of said balance-wheel, the gear-wheel A', carried by a shaft journaled in suitable bearings and meshing with said pinion, and the crank C, secured to the shaft of said gear-wheel, substantially as and for the purpose specified.

JOHN M. HALL.

Witnesses:
JOHN G. SUTHERLAND,
QUINCY A. THOMAS.